United States Patent
Jann et al.

[11] Patent Number: 5,978,091
[45] Date of Patent: Nov. 2, 1999

[54] LASER-BUMP SENSOR METHOD AND APPARATUS

[75] Inventors: Peter C. Jann, Santa Clara; Marco A. Krumbuegel, Danville; Reginald Lee, Alameda; Ming M. Yang, San Jose, all of Calif.

[73] Assignee: HMT Technology Corporation, Fremont, Calif.

[21] Appl. No.: 09/105,695

[22] Filed: Jun. 26, 1998

[51] Int. Cl.$^6$ .......................... G01B 11/24; G01B 11/30; G01N 21/00; G01N 21/88
[52] U.S. Cl. .......................... 356/376; 356/237; 356/371; 356/426; 250/572
[58] Field of Search .................................. 356/376, 237, 356/426, 371

[56] References Cited

U.S. PATENT DOCUMENTS

| | | |
|---|---|---|
| 5,062,021 | 10/1991 | Ranjan et al. . |
| 5,108,781 | 4/1992 | Ranjan et al. . |
| 5,377,002 | 12/1994 | Malin et al. ............................. 356/237 |
| 5,539,213 | 7/1996 | Meeks et al. ............................ 356/376 |
| 5,550,696 | 8/1996 | Nguyen . |
| 5,567,484 | 10/1996 | Baumgart et al. . |
| 5,586,040 | 12/1996 | Baumgart et al. . |
| 5,595,768 | 1/1997 | Treves et al. . |
| 5,635,269 | 6/1997 | Weir et al. . |
| 5,645,898 | 7/1997 | Sato et al. . |
| 5,699,160 | 12/1997 | Barenboim et al. . |
| 5,714,207 | 2/1998 | Kuo . |
| 5,729,399 | 3/1998 | Albrecht et al. . |
| 5,741,560 | 4/1998 | Rose . |
| 5,877,858 | 3/1999 | Kerstens et al. . |

*Primary Examiner*—Frank G. Font
*Assistant Examiner*—Roy M. Punnoose
*Attorney, Agent, or Firm*—Peter J. Dehlinger; Jeffery D. Frazier

[57] ABSTRACT

An apparatus for measuring the height and diameter of laser-zone texture bumps on a rigid magnetic disk substrate is disclosed. The apparatus has a disk holder for supporting and rotating the substrate, and an optical beam-source assembly for directing a focused laser beam on the substrate, and for shifting the position of the beam's illumination spot on the substrate in a tracking (radial) direction. An optical detection assembly in the apparatus measures the deflection of the laser beam due to specular reflection of the beam by laser-zone texture bumps, as a function of time, in both scanning (circumferential) and tracking directions. A computational device in the apparatus functions to (i) calculate scanning and tracking deflection values which characterize beam deflections in the scanning and tracking directions, respectively, for a texture bump passing through the illumination spot produced by the beam on the substrate, (ii) select for bump-height analysis, those texture bumps whose scanning deflection values are above a selected threshold value and whose tracking deflection values are below a selected threshold value, indicative of a condition in which the selected textured bumps are each in focus and centered within said illumination spot, and (iii) determine the texture bump heights and diameters of the selected bumps from the beam deflections in the scanning direction. Also disclosed is a method by which the apparatus measures the light power which is scattered by the of laser-zone texture bumps on a rigid magnetic disk substrate.

20 Claims, 10 Drawing Sheets

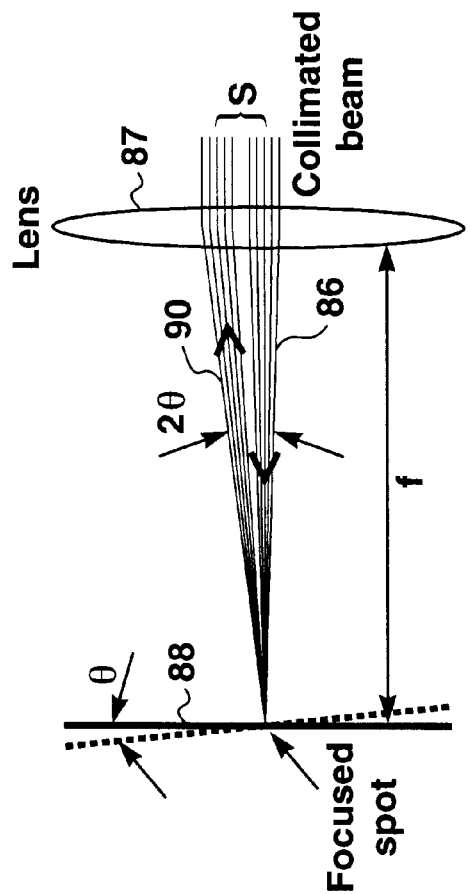
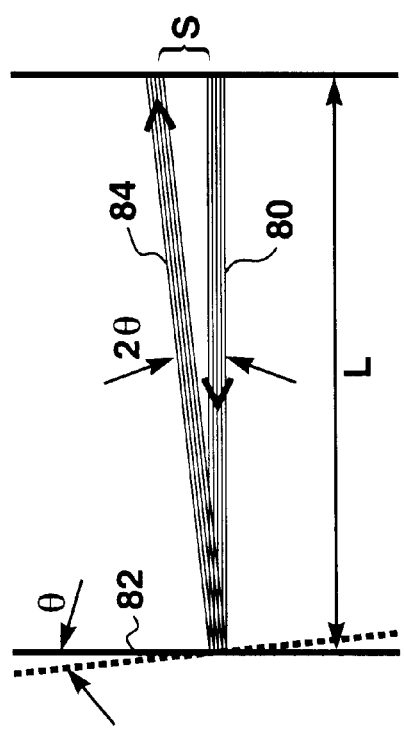
Fig. 4B
Fig. 4A

| Conditions: | BFS signal: | BFT signal: | Max/min Save: |

LASER-BUMP SENSOR METHOD AND APPARATUS

FIELD OF THE INVENTION

The present invention relates to a method and apparatus for measuring the characteristics of laser-zone texture (LZT) bumps formed on a rigid magnetic disk substrate.

BACKGROUND OF THE INVENTION

The surface of a thin-film recording disk is divided into a textured landing zone adjacent the inner-diameter, where the read-write head in a hard drive can land on the disk, and a data zone extending from the landing zone to the outer diameter of the disk.

The purpose of the texturing in the landing zone is to reduce start-stop stiction when the head lands on the disk at a start or stop condition. Without texturing, high stiction would exert occasionally catastrophic forces on the read-write head. The texturing in the landing zone must have a certain minimum roughness factor in order to avoid this type of high-stiction problem.

Typically, a thin-film media disk is textured by texturing the disk substrate, e.g., a nickel-phosphorus-coated aluminum substrate or glass or ceramic substrate, then sputtering various thin film layers on the substrate surface to form the thin-film media. Since the thin-film layers adopt the texture patterns of the underlaying substrate, the final disk has about the same texture features, i.e., roughness features, as the originally textured substrate.

With a greater emphasis on higher data density and lower flying heights in a hard disk, there is increased need for landing-zone texturing that provides adequate roughness, but with low-height surface texture features. In particular, with fly heights currently approaching less than $1\mu$ in, it is important that the landing zone texture features themselves have sub-$1\mu$ in heights.

The need for carefully controlled surface texture roughness and feature height has encouraged the development of laser-zone texturing (LZT). By directing laser pulses of desired energy at surface areas on a spinning substrate, bumps with desired height and diameter distributions can be formed. By selecting suitable pulse frequencies and substrate rotational rates, known bump densities are achieved.

Because of the critical need to achieve laser bumps within a given height distribution, it is important to monitor laser bump characteristics, either during laser-zone texturing, to provide feedback control for laser-ablation power settings, or to examine textured substrates prior to sputtering, as part of a quality control program to ensure that finished media will have the desired bump height distribution characteristics.

SUMMARY OF THE INVENTION

In one aspect, the invention includes an apparatus for measuring the height distribution of laser-zone texture bumps on a rigid magnetic disk substrate. The apparatus has a disk holder for supporting the substrate and rotating the same about its axis, and an optical illumination assembly for directing a focused laser beam on the substrate, with the substrate supported and rotated by the disk holder. The assembly has a shiftable carriage for shifting the tracking position on the substrate of an illumination spot produced by the focused laser beam.

Also forming part of the apparatus is an optical collection assembly for measuring the deflection of the laser beam due to specular reflection of the beam by laser-zone texture bumps, as a function of time, in both scanning (circumferential) and tracking (radial) directions. Information, e.g., an output signal voltage, from the detection assembly is fed to a computational device for (i) calculating deflection values which characterize the beam deflections in the scanning and tracking directions for a texture bump passing through the illumination spot produced by the beam on the disk, (ii) selecting for bump-height analysis, those texture bumps whose scanning deflection values are above a selected threshold value, and whose tracking deflection values are below a selected threshold, indicative of a condition in which the selected textured bumps are each in focus and radially centered within said illumination spot, and (iii) determining the texture bump heights of the selected bumps from the beam deflections in the scanning direction.

The computational device may be operatively connected to the carriage for shifting the same in increments effective to shift the illumination spot in the tracking direction a distance substantially less than the diameter of the spot. For example, the illumination spot may be in the 1.5 to 5.0 $\mu$m range, e.g., about 2.5 $\mu$m, and the incremental shifting, in the range less than about 0.3 $\mu$m, e.g., 0.1 $\mu$m.

The optical illumination assembly may include a position sensor operatively connected to the computational device for detecting changes in the pointing angle of the axis of said focused laser beam. The device in this embodiment is designed to correct the deflections measured by the scanning and tracking position sensors for changes in the beam axis.

The optical illumination assembly may further include an objective lens composed of two achromat lenses, each having a plane parallel glass plates located near the short-conjugate side of the lens. The lens is characterized by diffraction limited on-axis performance, and off-axis performance that is not diffraction limited.

In one embodiment, the optical detection assembly includes a position sensor for (i) detecting the scanning and tracking deflections caused by specular reflection of such beam, and (ii) generating time-dependent voltage signals whose amplitudes are proportional to the extent of such deflections. In one embodiment, the sensor includes first and second position sensing detectors disposed on opposite sides of the optical axis of the undeflected beam, or with reversed polarity, and a differential amplifier for summing the amplitude of the output signals from the two detectors, to enhance the signal-to-noise ratio of the output voltage of each of the sensors.

The computational device may include an integrator for integrating the time-dependent output signal of the scanning position sensor over time. The device may also measure bump diameter from the peak-to-peak distance between bump height maxima in a bump. In one embodiment, the computational device includes software for (i) multiplying the Fourier transform of the output signal of the scanning position sensor with reciprocal of the Fourier transform of a correction function which describes the intensity distribution of the focused illumination spot, and (ii) performing a reverse Fourier transform on the multiplied signal, to generate a corrected scanning output signal.

In another aspect, the invention provides a method of measuring the height distribution of laser-zone texture bumps on a rigid magnetic disk substrate. The method includes illuminating the substrate, with such rotating about its center axis, with a focused laser beam, and measuring the deflection of the laser beam due to specular reflection of the beam by laser-zone texture bumps on the substrate, as a function of time, in both scanning (circumferential) and tracking (radial) directions.

From these measurements, values which characterize beam deflections in both the scanning and tracking directions are calculated. Bump height determinations are made for those bumps whose scanning deflection values are above a selected threshold value, and whose tracking deflection values are below a selected threshold value, indicative of a condition in which the selected bumps are each in focus and centered within the illumination spot formed by the focused laser beam on the substrate.

Various embodiments of the method correspond to the methods carried out by various embodiments of the apparatus described above.

These and other objects and features of the invention will become more apparent when the following detailed description of the invention is read in conjunction with the accompanying drawings.

BRIEF DESCRIPTION OF THE DRAWINGS

FIGS. 4A and 4B illustrate the principle of beam deflection in response to surface bump features;

DETAILED DESCRIPTION OF THE INVENTION

Figure 1:
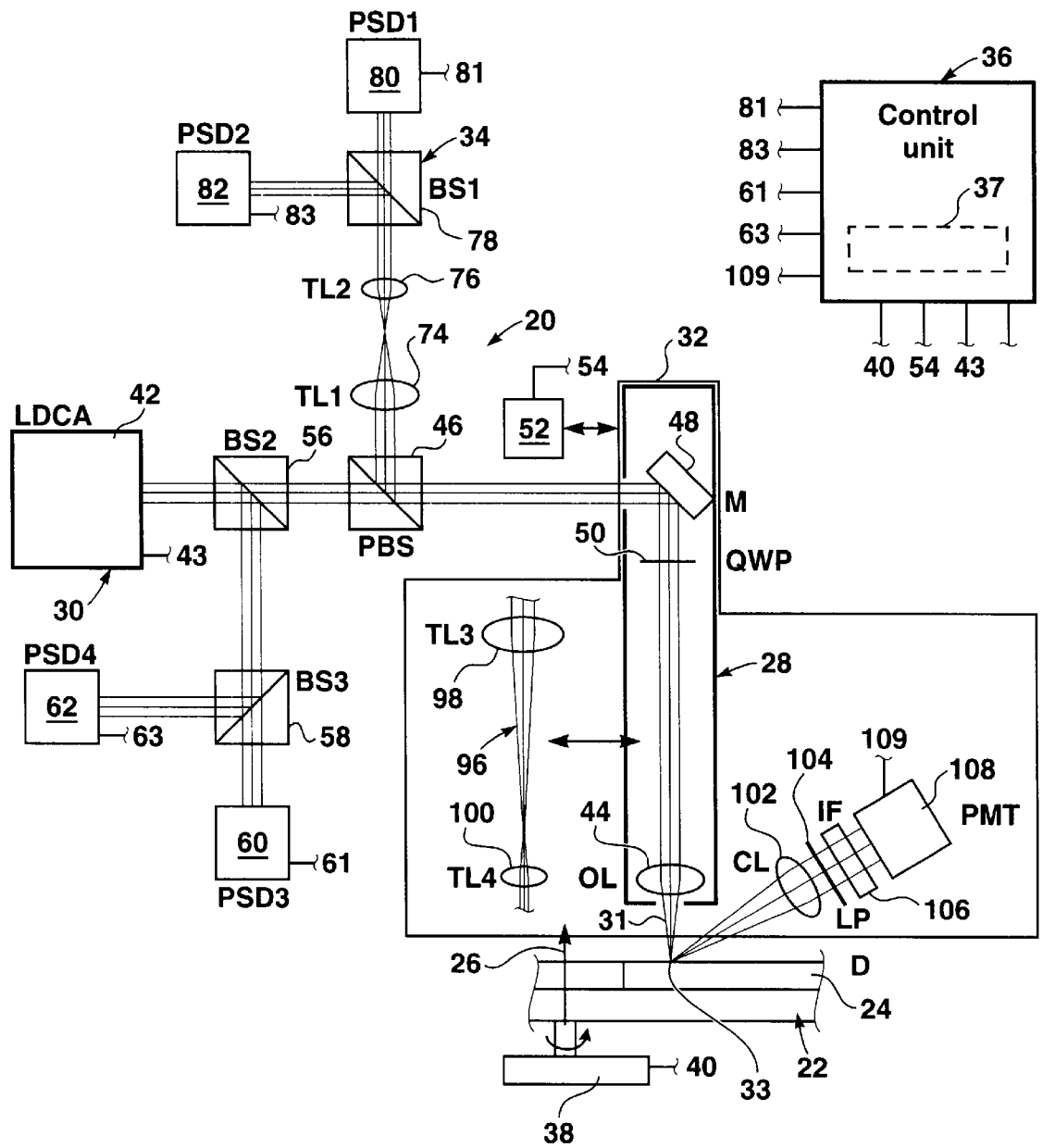
FIG. 1 is a schematic view of a laser-bump sensor apparatus constructed in accordance with the invention.

FIG. 1 illustrates a laser-bump sensor (LBS) apparatus 20 constructed in accordance with the invention, for measuring the height distribution of laser-zone texture (LZT) bumps on a rigid magnetic disk substrate.

Overview

The apparatus includes a disk holder 22 for supporting a substrate 24 and rotating the same about its axis, indicated at 26. A brightfield optical beam assembly 28 in the apparatus provides an optical beam-source 30 for directing a focused laser beam 31 on the substrate, with the substrate supported and rotated by the disk holder, producing an illumination spot 33 on the disk. The beam assembly has a shiftable carriage 32 for shifting the tracking position of an illumination spot on the substrate.

A brightfield optical detection assembly 34 in the apparatus functions to measure the deflection of the laser beam due to specular reflection of the beam by LZT bumps, as a function of time, in both scanning (circumferential) and tracking (radial) directions. The brightfield beam-source and detection assembly collectively make up brightfield scanning and tracking channels, each generally referred to a brightfield channel (BFC).

A control unit 36 in the apparatus includes computation device 37 that receives input from the optical detection assembly, and processes the input signals to calculate deflection values which characterize beam deflections in scanning and tracking directions for a LZT bump passing through the illumination beam.

In accordance with the invention, and as detailed below, the computation device selects for bump-height analysis, those LZT bumps whose scanning deflection values are above a selected threshold value, and whose tracking deflection values are below a selected threshold, indicative of a condition in which the selected LZT bumps are each in focus and radially centered within the illumination spot. The bump heights of the selected bumps are then calculated to give a bump height distribution of the laser-textured area of the substrate.

Although not shown here, the apparatus output may be operatively connected to a laser-zone texturing tool, for controlling the laser power settings of the tool in response to the LZT bump height distribution output from the apparatus. In this mode, the apparatus is able to adjust and correct laser zone texture features in real time. Alternatively, the apparatus may be operated independently of the LZT tool, typically to provide rapid, high-resolution monitoring of LZT bump height and diameter distribution characteristics of substrates, before the substrates are further processed, e.g., by thin-film sputtering, in the production of thin-film recording media.

Textured Substrate and Holder

Considering now the details of the apparatus, disk holder 22 includes a support 35 which supports substrate 24, and which is mounted on a motor 38 for rotation about a central axis corresponding to the center axis of the substrate, with such held and positioned on the support. The motor operates in a constant linear velocity (CLV) mode which maintains the substrate surface velocity at approximately 3.15 m/sec, regardless of the radius at which the LZT bumps are being formed. The motor is under the control of control unit 36, operatively connected thereto by a connection 40.

The substrate being examined in the apparatus is one which has been textured by laser-zone texturing, typically on both substrate sides and in an inner-diameter landing-zone region of the substrate. Laser texturing devices and methods are detailed, for example, in U.S. Pat. Nos. 5,062,021, 5,108,781, and 5,586,040. Typically, the laser-zone texturing process is effective in producing bumps having heights on the order of 150–250 Angstroms and diameters on the order of 5–8 um with both radial and circumferential spacings on the order of 45 um. The substrate may be a metal, metal coated, e.g., nickel-phosphorus coated aluminum, ceramic, glass, or other suitable material.

Unless otherwise indicated, the terms "substrate" and "disk" are used interchangeably herein, in part reflecting the fact that the apparatus may be used to measure LZT bump height and diameter on either a textured substrate or finished thin-film disk.

Optical Beam Assembly

With continued reference to FIG. 1, beam-source assembly 28 uses a laser diode collimator assembly (LDCA) 42 as a light source and a well corrected aspheric objective lens (OL) 44 to illuminate the disk surface with a diffraction limited focused spot 33 of light. The illumination spot has a $1/e^2$ diameter between about 1.5–5.0 μm, typically 2.5 um, a wavelength between 600 and 700 nm, typically 670 nm, is normally incident, and is circularly polarized. One exemplary LDCA is model # ACM6.5(670-10), available from Power Technology (Mabelvale, Ark.), and characterized by a wavelength of 670.0 nm, output power 6.5 mW, linear polarization with a 100:1 extinction ratio, and $1/e^2$ beam diameter of 3.3 mm. The LDCA 42 is operatively connected to the control unit 36 by a connection 43.

A polarized beam splitter (PBS) 46, a flat mirror (M) 48, and a quarter-wave plate (QWP) 50 are used to direct the LDCA's output beam to the objective lens. One exemplary PBS is model # 05FC16PB.5 from Newport (Irvine, Calif.), having a 12.7 mm size. An exemplary QWP is model # 02WRQ001/670.0/078 from Melles Griot (Irvine, Calif.), which is a multiple order quartz retardation plate with a retardation tolerance of lambda/500, and a 10 mm diameter. An exemplary mirror is a model # 05D20DM.4 from Newport, having a 12.7 mm diameter. An exemplary OL is model # 5715-B-H from New Focus (Santa Clara, Calif.), a mounted glass aspheric lens.

As seen, the mirror, quarter wave plate and objective lens form part of optical carriage 32 which is movable, in a plane of the drawing, to shift the position of the beam spot on the disk in a tracking (radial direction). The carriage is shifted by a stepper motor 52 under the control of unit 36, and operatively connected thereto by connection 54.

Correction to the Pointing Angle of the Beam

In one embodiment, the optical assembly additionally includes a pair of position sensing detectors (PSD's) to monitor the pointing angle of the output beam of the laser diode collimator assembly (LDCA). Since the brightfield channels of the apparatus measure incident illumination beam deflection, as a consequence of reflection by the disk surface under inspection (discussed below), any changes in the pointing angle of the LDCA's output beam will produce spurious components in the brightfield channels' output signals. The present modification is designed to eliminate these spurious components.

As seen in FIG. 1, two 50/50 beam splitters 56, 58 (BS2 and BS3) and two position sensor detectors 60, 62 (PSD3 and PSD4) have been added to the illumination optics to permit the monitoring of the LDCA's output beam pointing angle. The PSD's are used in a differential mode and the resulting scanning and tracking axes output signals are subtracted from the brightfield collection optics scanning and tracking output signals (see below), respectively, thereby canceling the spurious effects of LDCA output beam pointing instability. The electronics implementation is contained in the control unit and will be described with respect to FIG. 8 below. An exemplary PSD is a Model # 2L4SP duo-lateral two-dimensional continuous Si photodiode from On-Trak Photonics (SiTek) (Lake Forest, Calif.) with an active area of 4.0×4.0 mm, and a sensitivity of 0.45 A/W. The output signals from PSD3 and PSD4 are supplied to the control unit through connections 61, 63, respectively.

Objective Lens Embodiment

Figure 2:
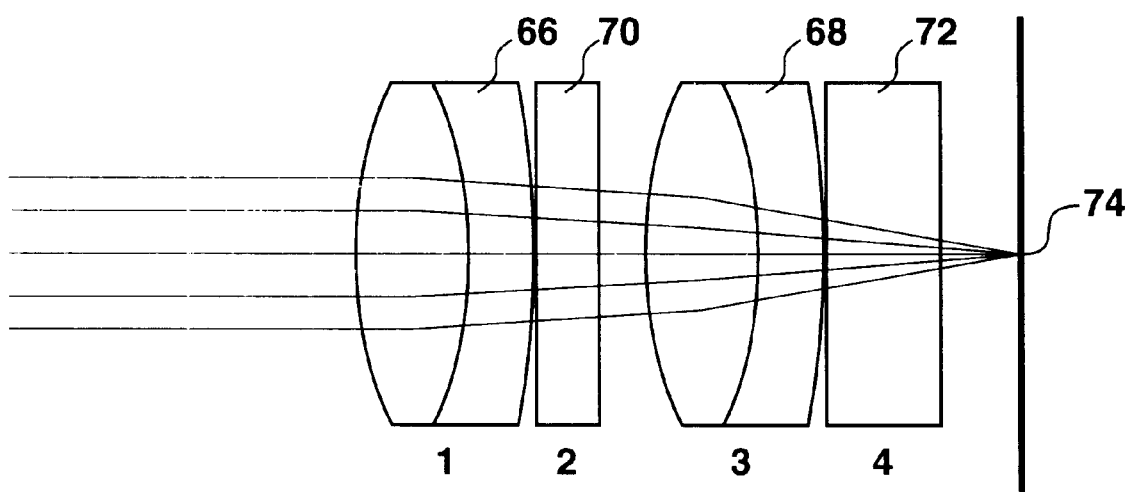
FIG. 2 shows elements of an objective lens constructed for use in the apparatus of the invention.

In a preferred embodiment, the objective lens in the beam assembly is an infinity conjugate corrected objective lens 64, as illustrated in FIG. 2. The lens uses a pair of commercially available achromat lenses 66, 68 in combination with a pair of custom high index plane-parallel plates 70, 72. These plates effectively reduce the spherical aberration which is normally produced by the use of just the achromatic lenses themselves. Lenses 66, 68 are, for example, off-the-shelf achromats supplied by Melles Griot (model 01LAO003); plates 70, 72 are, for example, custom plane-parallel plates made of Schott SFL6 (Duryea, Pa.), with thicknesses of 2.000 and 3.000 mm, respectively. With these components, the objective lens has an effective focal length of 9.169 mm, a clear aperture radius of 3.75 mm, and for a numerical aperture of 0.180, is capable of forming a nearly diffraction limited focused spot diameter of 2.4 um.

As noted above, the illumination spot, indicated at 74 in the figure, must have a $1/e^2$ diameter on the order of a few micrometers if reasonable profiling sensitivity is to be achieved. This requires essentially diffraction limited on-axis performance. The reflected beam, however, returns off-axis and is used in such a way that only the position of the centroid of the beam's intensity distribution is measured. This off-axis beam's wavefront quality therefore doesn't need to be diffraction limited. (This is not the case for surface profiling applications where confocal techniques are used which typically require diffraction limited performance over the full clear aperture of the objective lens.)

The use of an achromat pair fulfills the requirement for a short focal length, while the large inherent clear apertures of the achromats provide a large clear aperture for the objective lens as a whole. The novel aspect of this lens design is the use of two simple achromats with plane-parallel plates, such that each achromat has a plate located on its near conjugate side.

Figure 3A:
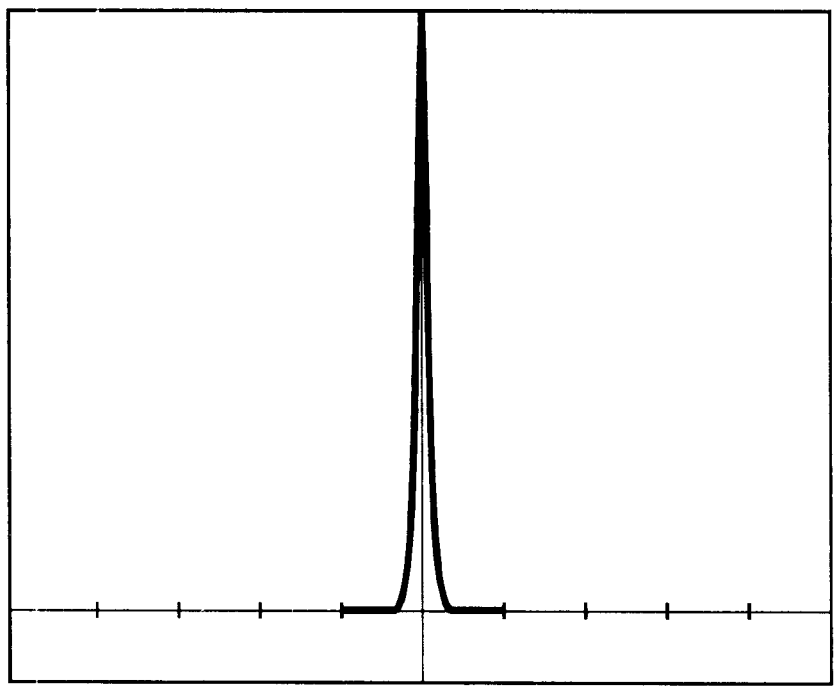
FIGS. 3A and 3B show point spread functions in both X (3A) and Y (3B) sections constructed from ray-tracing through the lens in FIG. 2.
Figure 3B:
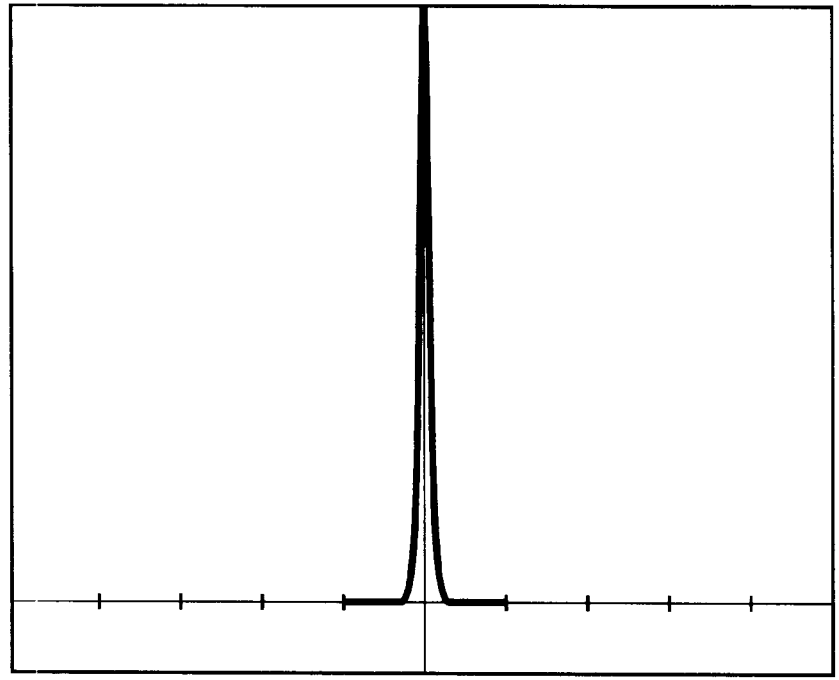

The ray-tracing predicts a Strehl Ratio of 0.975, where a Strehl Ratio of 1.000 corresponds to perfectly diffraction limited performance. This is illustrated in FIGS. 3A and 3B, which show the point spread function of both X and Y sections. The same input ray set, but without the custom plane-parallel plates, yields a much lower Strehl Ratio of 0.891, indicating relatively poor performance which is not diffraction limited performance.

Brightfield Optical Detection Assembly

As the LZT region of the spinning disk's surface moves through the focused illumination spot, both specular and diffuse reflected beams are produced. The specularly reflected beam is received by brightfield detection assembly 34 which includes telescope lenses 74, 76 (TL1 and TL2), a 50/50 beamsplitter 78 (BS), and two-dimensional position sensing detectors 80, 82 (PSD1 and PSD2). Exemplary two-dimensional PSD's are the same as those given above for PSD3 and PSD4. The output signal of PSD1 and PSD2 are supplied to the control unit through connections 81, 83, respectively. The two detectors collectively form a position sensor for (i) detecting the scanning and tracking deflections caused by specular reflection of such beam, and (ii) generating time-dependent voltage signals whose amplitudes are proportional to the extent of such deflections.

The QWP, M, and PBS in the beam assembly direct the specularly reflected beam into these brightfield detectors, where the beam's lateral displacements in both the scanning and tracking directions are detected by both PSD1 and PSD2. The lateral displacement depends upon the specularly reflected beam's angle of reflection at the disk surface, as will now be described.

FIGS. 4A and 4B illustrate the principle by which the optical detection system detects changes in the slope of an LZT bump, as a bump moves through an illumination spot on a substrate. In the optical lever principle illustrated in FIG. 4A, an illumination beam 80 is reflected from a (substrate) surface, whose surface plane is shown in solid line at 82. At the particular instant in time that is illustrated, and with the disk surface rotating in a plane normal to the plane of the figure, the illumination spot "sees" a bump slope of angle theta, measured with respect to the plane of the substrate. This slope causes the beam deflection of 2*theta in the reflected beam 84. The deflection distance S at a distance L from the disk is therefore L*tan(2*theta) which reduces to 2*L*theta for small theta.

FIG. 4B illustrates the same principle for a beam 86 focused through an objective lens 87 with a focal length f, as in the optical detector assembly in the apparatus. Here beam deflection by the same slope angle theta produces an overall deflection S equal to 2*f*theta in the reflected beam, as shown.

Figure 5:
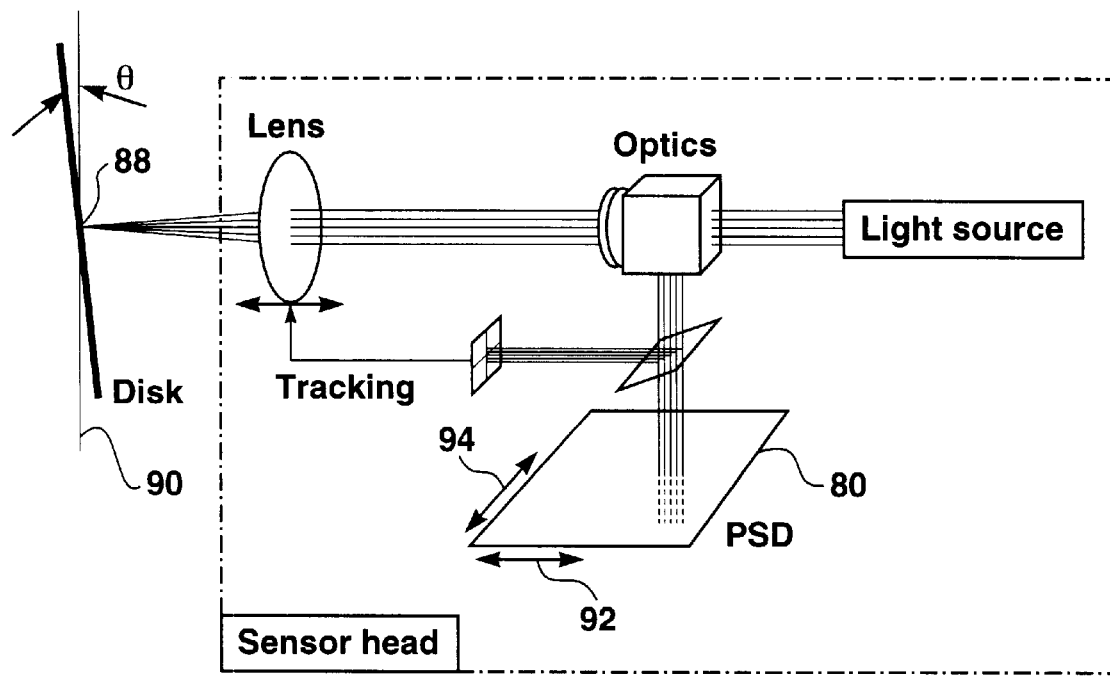
FIG. 5 illustrates how beam deflection in two dimensions is detected with a position sensing detector in the apparatus.

FIG. 5 illustrates the same principle, but shows how beam deflection is detected in two dimensions by each PSD, such as detector 80. Briefly, the reflected beam from a focused light spot 88 on a substrate, whose plane is shown at 90, is deflected by a LZT bump in accordance with the principles just mentioned. Assuming the scanning direction to be in the plane of the figure, changes in the slope of the bump in the scanning direction will produce deflections in the detector in the direction indicated by arrow 92. Similarly, changes in the slope of the bump in the tracking direction, i.e., in the direction normal to the plane of the figure, will produce deflections in the detector in the direction indicated by arrow 94.

The principle of operation of the two dimensional PSD's in the optical detection assemblies described, for example, in product specifications supplied by On-Trak Photonics. Briefly, a duolateral two-dimensional PSD is able to detect incident light spot position anywhere on its active surface. The PSD has four terminals, and photoelectric current generated by the incident light spot flows through the device and can be seen as two output currents. The distribution of output currents gives the light spot position in one dimension and the distribution of input currents gives the light spot position in the second dimension.

Figure 6:
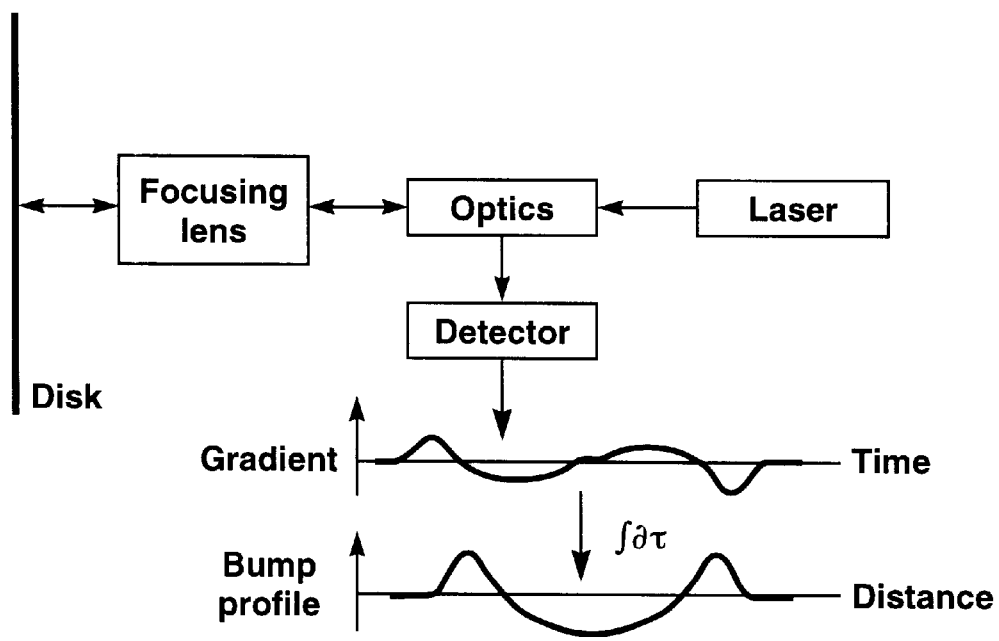
FIG. 6 shows the basic steps in converting bump surface gradient or slope into reflected beam-deflection, and the integration of the resulting output signal to obtain the bump surface profile or height.

The PSD's are followed by transimpedance preamplifiers (see below) whose output signals are therefore voltage waveforms whose amplitudes are linearly proportional to the lateral displacement of the incident return beam and hence also the slope of the disk surface in both the scanning (circumferential) and tracking (radial) axes along the disk. The resulting voltage signal shows the change in slope, i.e., gradient, as a function of time, as an LZT bump passes through the illumination spot. The gradient measured for a single LZT bump is shown in FIG. 6. Simple numerical integration may then be applied to the digitized output signals to convert the surface slope information to surface height, thereby obtaining the height distributions of the LZT bumps, as shown at the bottom in FIG. 6.

Darkfield Optical Detection Assembly

As previously mentioned, the LZT region of the disk produces both specular and diffuse reflected beams. The portion which is scattered or diffracted out of the specularly reflected beam forms the diffuse reflected beam. Part of this is received by a darkfield detection assembly 100 and is used to quickly verify the presence of the LZT bumps.

The darkfield detection assembly consists of a collection lens 102 (CL), a linear polarizer 104 (LP), an interference filter 106 (IF), and a photomultiplier tube 108 (PMT). The output signal of the PMT is supplied to the control unit through connection 109. With reference again to FIG. 1, the apparatus also provides an illumination subsystem for the darkfield detection assembly, indicated generally at 96 in the figure. The use of this detection assembly requires that objective lens 44 (OL) be replaced with telescope lenses 98, 100 (TL3 and TL4), in order to change the illumination spot $1/e^2$ diameter from 2.6 um to 550.

As carriage 32 first moves the LBS optical head over the radial center of the disk's LZT region, OL is replaced with TL3 and TL4 through the use of an actuated slide (not shown), and the DC component of the PMT's output signal is measured to verify the presence of the LZT bumps. The bare disk surface is so smooth that without the LZT bumps, virtually no light will be scattered out of the specular beam and hence no power will be detected by the PMT.

Also, the amount of power which is scattered into the darkfield channel is proportional to the height of the bumps. Therefore, not only can bump presence be quickly verified, but with simple calibration, the height of the bumps can also be estimated. This feature will serve as a check to the estimates of bump height which will be derived from the brightfield scanning output signals.

A rather large illumination spot $1/e^2$ diameter of 550 $\mu$m is used to make the darkfield channel insensitive to the following: 1) focus error due to a large NA and hence small depth-of-focus; 2) tracking error or disk radial position error so long as the illumination spot is completely filled with LZT bumps; and 3) contamination, especially if the disk is spinning and numerous DC component measurements are made and subsequently averaged for a mean power level.

Finally, the collection lens serves to collimate the beam of light entering the interference filter 106 (IF), since the IF only provides maximum transmittance at normal or near normal incidence. The IF has a narrow band-pass, transmits most of the light which is scattered by the LZT bumps (monochromatic light with a wavelength of 670 nm), and rejects virtually all ambient light (polychromatic light with a broad spectrum). The IF therefore serves to help isolate the darkfield collection optics from ambient room light, which can be excessive since the darkfield collection optics are looking at the disk at grazing incidence with a rather large NA of 0.158.

The linear polarizer 104 (LP) is optional and may be used to enhance the signal-to-background ratio associated with the light scattered simultaneously by both the LZT bumps and the surrounding surface, depending upon the difference in the polarization states between the two forms of scattered light. Finally, the optical axis of the darkfield collection optics may be pivoted about the focused illumination spot. Both the azimuth and elevation angle of this optical axis, relative to the disk surface, may be adjusted to maximize the amount of light power which is collected by the PMT. The scattered or diffracted light will have lobes or regions which are bright or dark and it is therefore necessary to center the darkfield collection optics on one or more of the bright regions for maximum signal-to-background and signal-to-noise ratios.

Signal-processing Electronics

Figure 7:
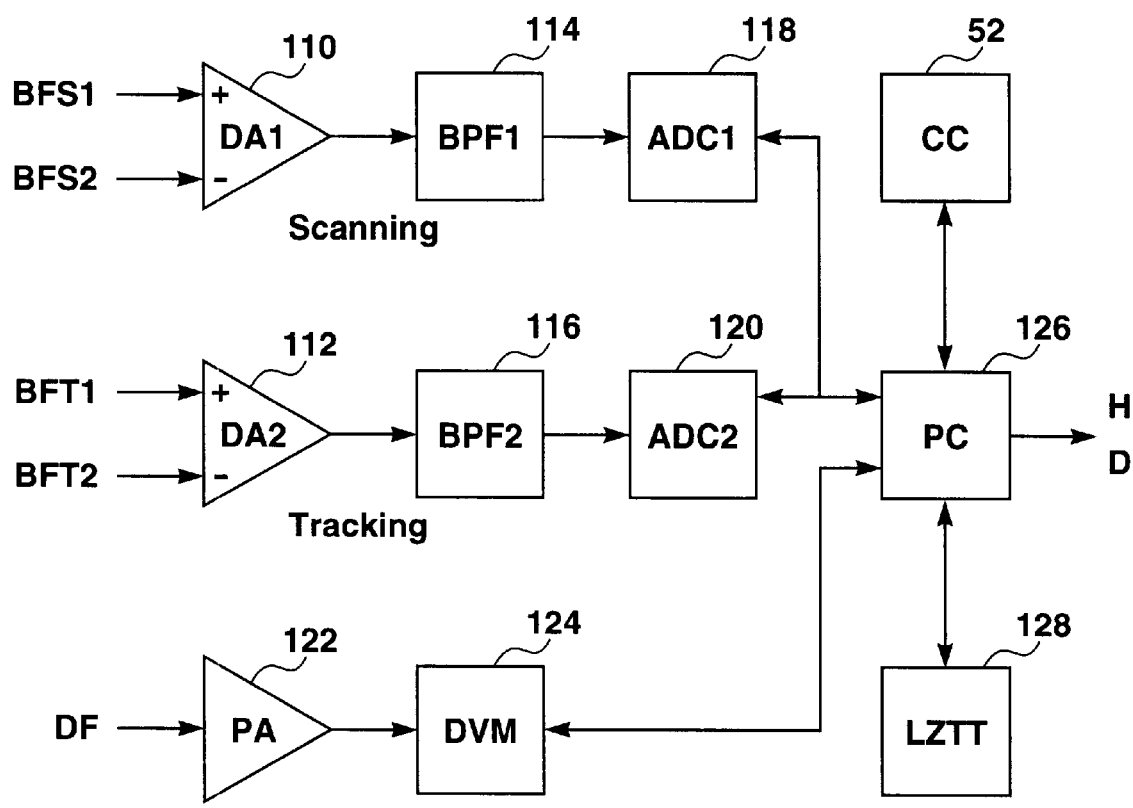
FIG. 7 is a block diagram of the system electronics for both the brightfield scanning and tracking channels and the darkfield channel.

FIG. 7 shows a block diagram of some of the basic signal-processing electronics in the control unit. Differential amplifiers 110, 112 (DA1 and DA2) combine the separate brightfield scanning (BFS1 and BFS2) and tracking (BFT1 and BFT2) output signals, respectively, where PSD1 produces one set or pair of scanning and tracking output signals, and PSD2 produces an identical set of output signals, but with opposite sign. That is, PSD2 is rotated 180 degrees about the optical axis (theta-z) relative to PSD1 (or has the opposite signal polarity). Positive lateral spot motion therefore produces an output signal with positive pulse amplitude from PSD1, but negative pulse amplitude from PSD2.

The scanning axis signals from both PSD1 and PSD2 (BFS1 and BFS2) drive DA1. The tracking axis signals from PSD1 and PSD2 (BFT1 and BFT2) drive DA2. Upon differential summing by both DA1 and DA2, the amplitudes of both the brightfield scanning and tracking output signals are essentially doubled, whereas the noise amplitudes are only increased by $2^{1/2}$. An enhancement in signal-to-noise ratio (SNR) of $2/2^{1/2}$ or $2^{1/2}$ is therefore obtained. This is only applicable to detector shot noise limited electro-optical systems where the noise variance (standard deviation squared) associated with the output signal current is proportional to the amplitude of this signal current. Here the SNR is proportional to the square root of the signal amplitude, and if a differential detector scheme is used, the SNR becomes proportional to the $2^{1/2}$ times the square root of the signal amplitude.

The output signals from DA1 and DA2 drive band-pass filters 114, 116 (BPF1 and BPF2), respectively. BPF1 and BPF2 are used to provide two functions: 1) high-pass filtering for the elimination of large amplitude disk axial run-out components and 2) low-pass filtering to prevent aliasing caused by analog-to-digital conversion which occurs at analog-to-digital converters 118, 120 (ADC1 and ADC2). Both ADC's have 11 bit quantization depths, use 10 MHz sampling frequencies, and have 0.5 MB of RAM. At a spindle angular velocity of 1425.2 rpm, which is typical for LZT tools, one complete disk revolution will produce 420, 994 data points for the brightfield channel.

The darkfield output signal (DF) from PMT 108 drives a simple transimpedance preamplifier 122 (PA) whose output signal's DC component is measured by a digital voltmeter 124 (DVM). Both ADC's and the DVM are read and controlled by a personal computer 126 (PC) forming part of the control unit. This PC also controls the carriage controller motor and may communicate with a host LZT tool 128 (LZTT), where the apparatus is used to control the laser pulse power in the host LZT tool, to produce the desired LZT bump height.

Figure 8:
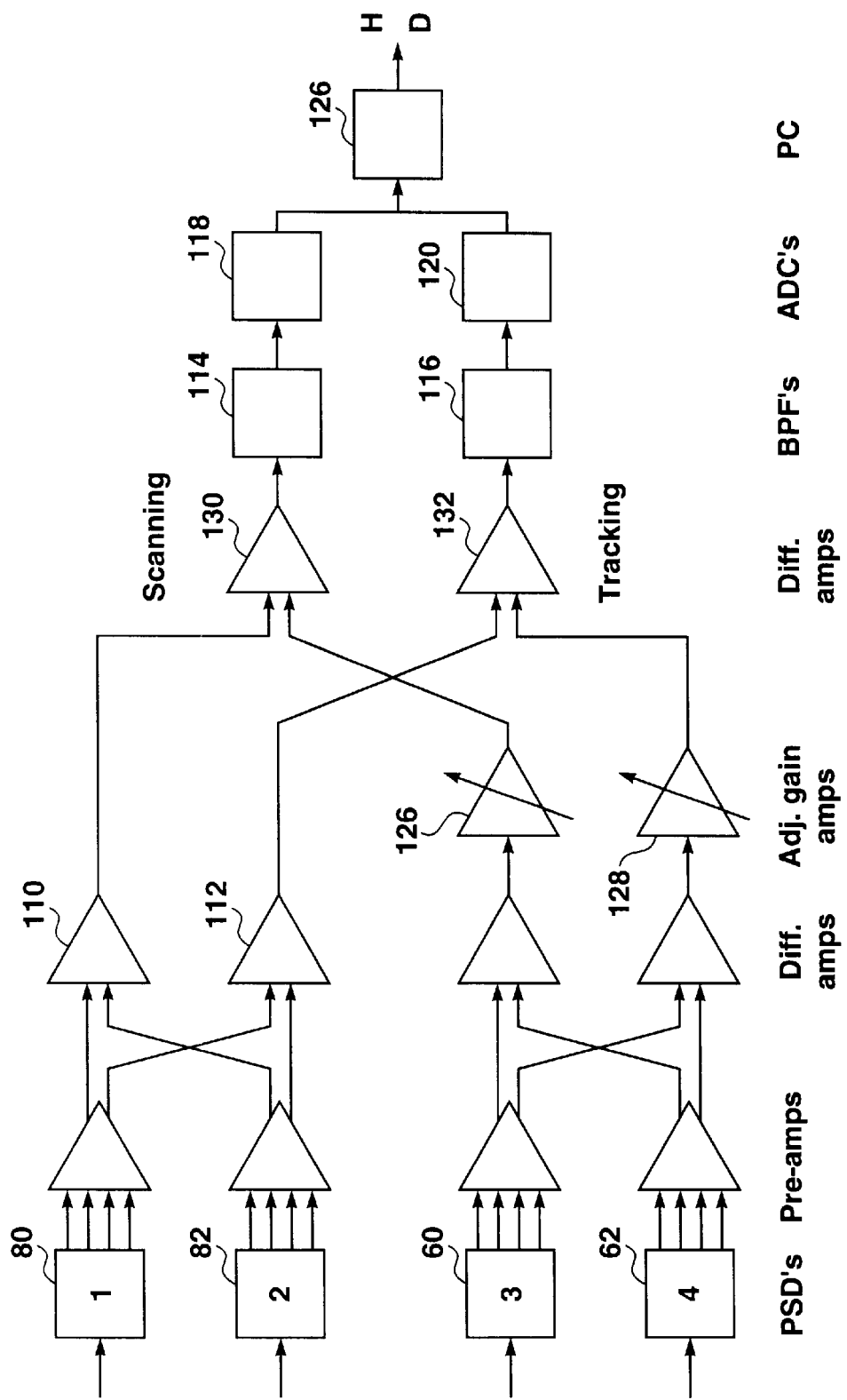
FIG. 8 is a block diagram of the system electronics for both the brightfield scanning and tracking channels and includes the subsystem for correcting the brightfield channel output signals for laser output beam pointing instability.
Figure 9A:
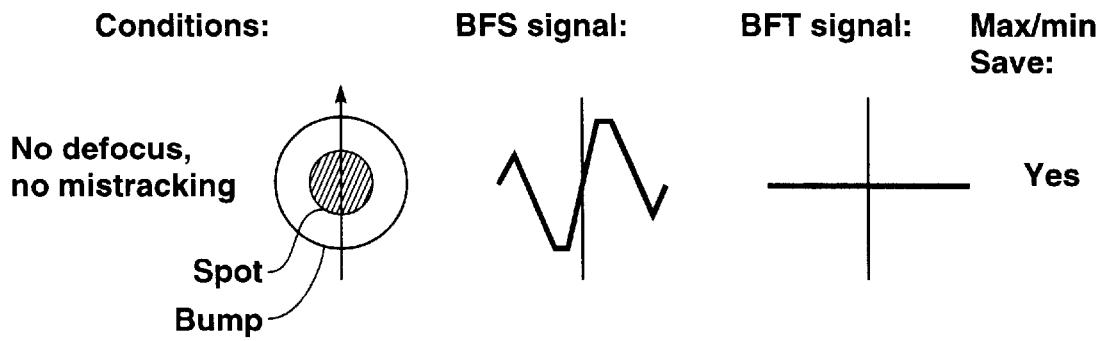
FIG. 9 shows, in frames (a)–(d), the four possible conditions of focus and tracking of the focused illumination spot on the disk surface LZT bumps and how the "max/min save" algorithm processes the brightfield scanning and tracking output signals.
Figure 9B:
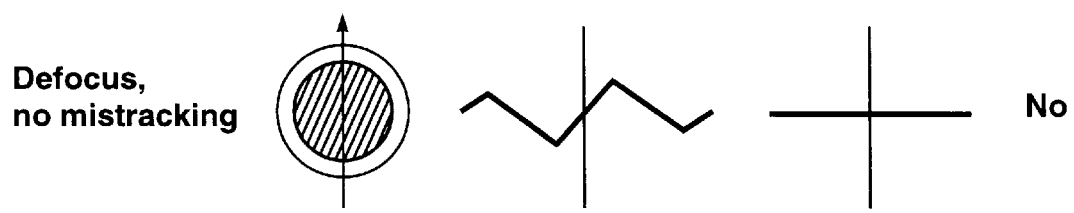
Figure 9C:
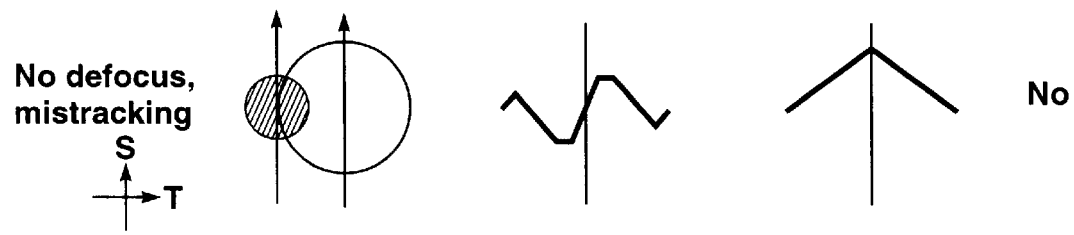
Figure 9D:
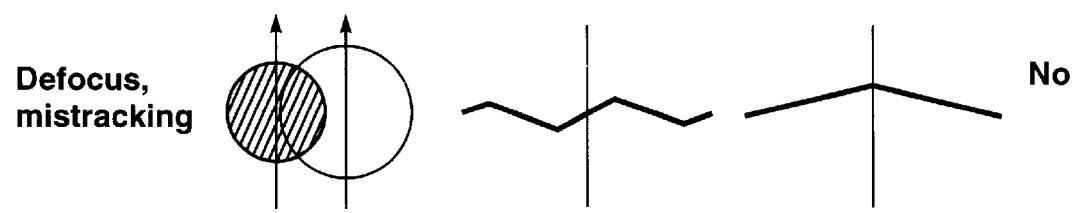

FIG. 8 shows the brightfield optics electronics as modified to correct for variations in the pointing angle of the LDCA.

As seen, differential amplifiers, such as amplifiers 110, 112 described above, are used by both the brightfield collection optics PSD's (PSD1 and PSD2) and the LDCA monitor optics PSD's (PSD3 and PSD4). The LDCA monitor optics scanning and tracking output signals are then fed to adjustable gain amplifiers 126, 128. The outputs from these amplifiers, and from amplifiers 110, 112 are then fed to differential amplifiers 130, 132, where they are subtracted from the brightfield collection optics scanning and tracking output signals. The amplitudes of the monitor output signals are adjusted to be the same as those of the spurious signals in the brightfield channel output signals, thereby permitting accurate subtraction and therefore effective elimination of the spurious signals by the final stage of differential amplifiers.

The corrected scanning and tracking signals are then fed to band-pass filter's 114, 116, which are followed by analog-to-digital converters 118, 120, which are followed by computer 126, as described in FIG. 7. Subsequent signal processing is identical to that for the signal-processing electronics shown in FIG. 7.

"Min/max save" Algorithm

By simultaneously measuring the output signals from both of the brightfield scanning and tracking channels and implementing a "max/min save" algorithm, the apparatus is capable of reliably profiling the LZT bumps without the need for complex focus and tracking servos. This is made possible by the following inherent geometrical conditions of the spinning disk: 1) the LZT region is continuous and consists of hundreds of thousands of closely spaced bumps; 2) the bump tracks continually pass in and out of the focused illumination spot in both the focus and tracking axes due to disk axial run-out and a spiral shaped bump track, respectively; and 3) by using a step and repeat optical carriage motion with a 0.1 µm step size, these bumps can be repeatedly measured so that numerous bumps will pass directly through the center of the focused spot, in both the focus and tracking axes, such that output signals will be produced with portions which contain bump pulses with neither focus or tracking errors.

In operation, the carriage is stepped, stopped, and then stepped again as necessary until maximum brightfield scanning output signal amplitude is simultaneously detected with minimum brightfield tracking output signal amplitude. When this is the case, the focus and tracking errors are negligible and the corresponding scanning output signals are then saved and subsequently processed for estimates of bump crater height and diameter. Maximum brightfield scanning output signal amplitude only occurs when the bump is in focus and is well radially centered within the focused illumination spot. Minimum brightfield tracking output signal amplitude only occurs when the bump is perfectly radially centered within the focused illumination spot. As the disk spins, the axial run-out and spiral shaped bump track will continuously move a track of bumps up and down through best focus and back and forth across the circular shaped measurement track of the focused illumination spot. By measuring a complete disk revolution's worth of bumps and by only saving the portions of the brightfield scanning output signals which have maximum amplitude and occur simultaneously with brightfield tracking output signals of minimum amplitude, an ensemble of bump signals can therefore be collected which were produced under conditions of minimum defocus and tracking error. This is the essence of the "max/min save" signal processing algorithm whereby both focus and tracking servos are rendered unnecessary.

FIG. 9 illustrates the function of the "max/min save" algorithm. The figure shows, in frames (a)–(d), basic focus and tracking conditions, corresponding brightfield signals in the scanning (BFS) and tracking (BFT) directions as functions of focus and tracking conditions, and the algorithm's "save" and "reject" decisions.

Frame (a) in the figure, representing a focused-beam, aligned tracking condition, gives maximum BFS signal amplitude because of maximum reflected beam deflection in the scanning axis due to best focus, and minimum BFT signal amplitude because of minimum reflected beam deflection in the tracking axis due to best tracking alignment. This condition, in which the BFS signal, i.e., voltage amplitude, is above a given threshold, and the BFT signal, below a given threshold, triggers the algorithm to save the BFS signal for a bump profiling calculation.

The other three frames in the figure represent out-of-focus and/or off-alignment conditions in which the BFS signal is rejected, either because the BFS signal is below a critical threshold (frames (b) and (d)), due to lack of illumination spot focus, and/or because the BFT signal is above a critical threshold due to illumination spot misalignment (frames (c) and (d)).

In summary, the brightfield scanning output signal is only saved when it's amplitude is determined to be at a maximum at the same time as when the brightfield tracking output signal amplitude is determined to be at a minimum. The output signals from a complete disk revolution are evaluated in this fashion, one revolution at a time, as the optical head is moved in a stepped fashion in the radial direction over the LZT bump region of the disk under inspection.

Motor 52 in the apparatus, under the control of unit 36, is used to support and move the LBS optical head over the surface of the disk. The carriage first moves the optical head to place the focused illumination spot at the center of the band of LZT bumps. The disk is spinning and the focused illumination spot now repeatedly intersects one of the spiral tracks of bumps. The carriage is then stepped until the spot intersects the spiral track at a region where the bumps are in focus. The carriage is then micro-stepped to place these in-focus bumps within the center the spot, thereby fulfilling the above required signal conditions.

The disk's axial run-out moves the bumps up and down through focus such that, during one complete disk revolution, there are regions of bumps which are in focus. The optical head is stepped by the carriage until the focused illumination spot intersects the spiral track of bumps at an azimuth where the bumps are in focus, thereby producing a brightfield scanning output signal of maximum amplitude. The optical head is then micro-stepped until these in-focus bumps are centered about the focused illumination spot, thereby producing a brightfield tracking output signal of minimum amplitude. The disk radial run-out is compensated for by this micro-stepping. Disk non-repeatable run-outs in both the axial and radial directions, may introduce minor errors in the measurements which can be corrected through measurement averaging.

Multiple measurements of the same bump may be made and then averaged to eliminate the errors in both height and diameter which are introduced by the nonrepeatable axial and radial run-outs. Only a dozen or so different bumps within the LZT band need to be measured for accurate estimates of bump height and diameter. Finally, when the focused illumination spot doesn't intersect any bumps, both the brightfield scanning and tracking output signals have zero amplitude. These signals are band-pass filtered so as to be both AC coupled and without any low frequency disk once-around run-out components.

Bump Height Calculation

The scanning and tracking output signals from the PSD's are independently differentially combined for a $2^{1/2}$ increase in signal-to-noise ratio, as described above. Simple numerical integration is then applied to the digitized output signals to convert the surface slope information to surface height, thereby obtaining the height distributions of the LZT bumps, as illustrated in FIG. 6.

The accuracy of these height distributions will be limited by the finite size of the focused illumination spot. The LBS electro-optical system can be modeled as a linear time invariant system. Linear systems theory can therefore be applied to calculate the system's output for a given input. These output height distributions can be calculated through the convolution of the actual bump height distribution (complex reflectance distribution) with the Gaussian field amplitude distribution of the focused illumination spot. The modulus squared of the convolution integral is then calculated.

Figure 10:
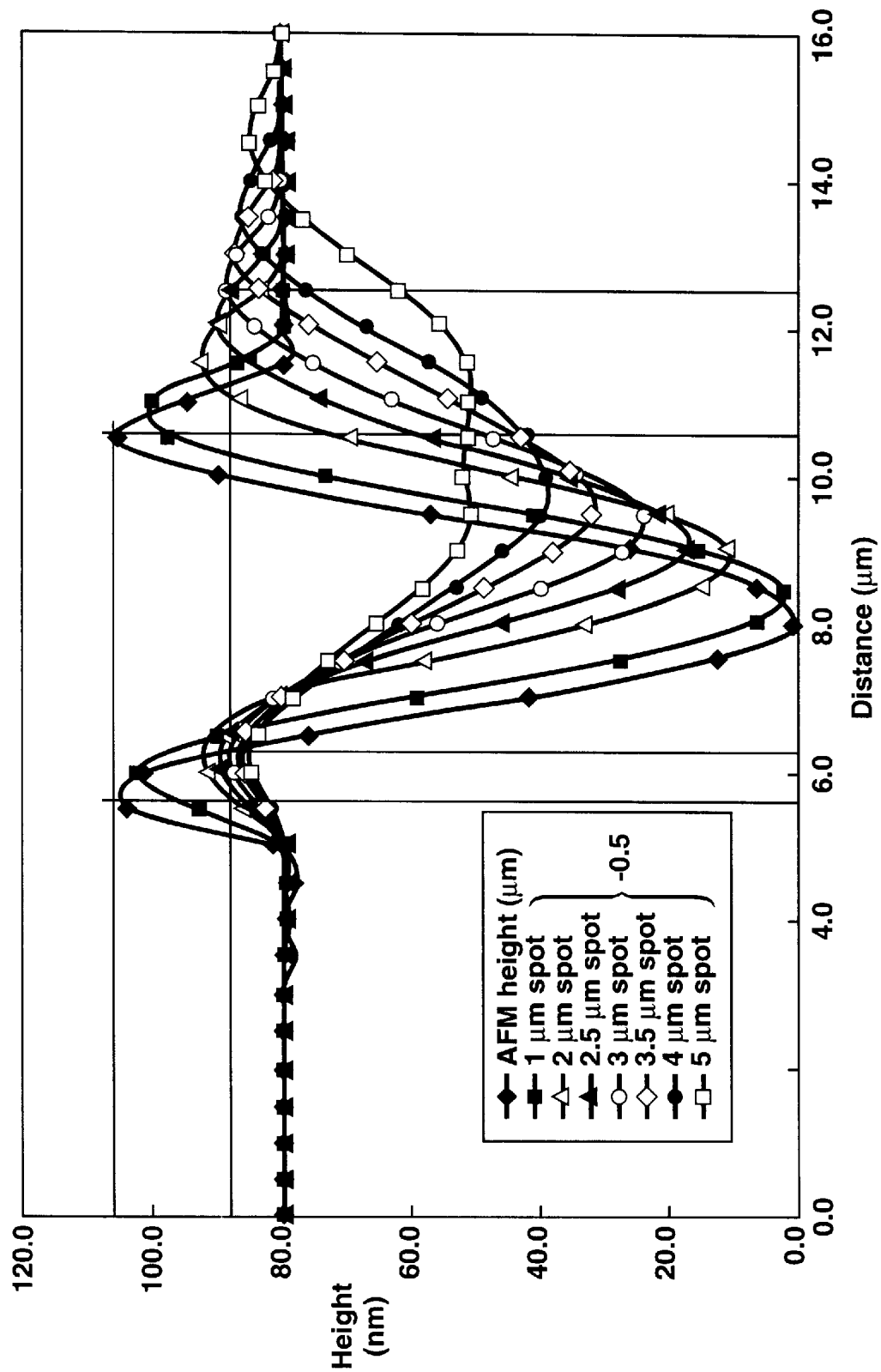
FIG. 10 illustrates the convolution effect of the finite size of the focused illumination spot upon the LZT bump height profiles.

Since the optical system uses coherent light, the system is linear in terms of field amplitude, not intensity. This is approximated in FIG. 10 for a "V" shaped bump with a crater wall height of about 250 Angstroms & a crater wall diameter of about 5 um. A Gaussian intensity distribution is used for the focused illumination spot and different $1/e^2$ spot diameters are considered. The "smearing-out" and reduction in amplitude of the bump's height distribution is clearly shown, especially as the focused illumination spot gets large. This inaccuracy can be compensated for either through calibration with another tool, such as an atomic force microscope (AFM), or through signal processing which includes the following deconvolution operation.

The deconvolution algorithm is best performed in the Fourier transform domain. In this algorithm, the brightfield scanning output signal which is saved as a consequence of the "max/min save" algorithm is Fourier transformed through the use of a Fast Fourier Transform (FFT) software routine, such as one of those described in Brigham, E., *The Fast Fourier Transform,* Prentice-Hall, 1974. The transformed signal is then multiplied by the reciprocal of the Fourier transform of a correction function which describes the intensity distribution of the LBS's focused illumination spot. This function can be accurately described by a two-dimensional Gaussian with a peak value of 1.0 and a $1/e^2$ width of 0.83 usec. This width depends upon the radius of the track on the disk being measured if the host LZT tool spindle is used in a constant angular velocity (CAV) mode, versus a constant linear velocity (CLV) mode where a constant correction function width can be used.

The multiplied signal is then inverse Fourier transformed to place it back in the time domain with a corrected brightfield scanning output signal. The above multiplication has to be done carefully so that artifacts aren't produced as a result of discontinuities in the waveform vectors which are being multiplied. This technique has been used in microdensitometry, as described, for example, in Jones, R., et al., Photographic Science and Engineering, 11(2):102 (1967).

Operation of the Apparatus

Figure 11:
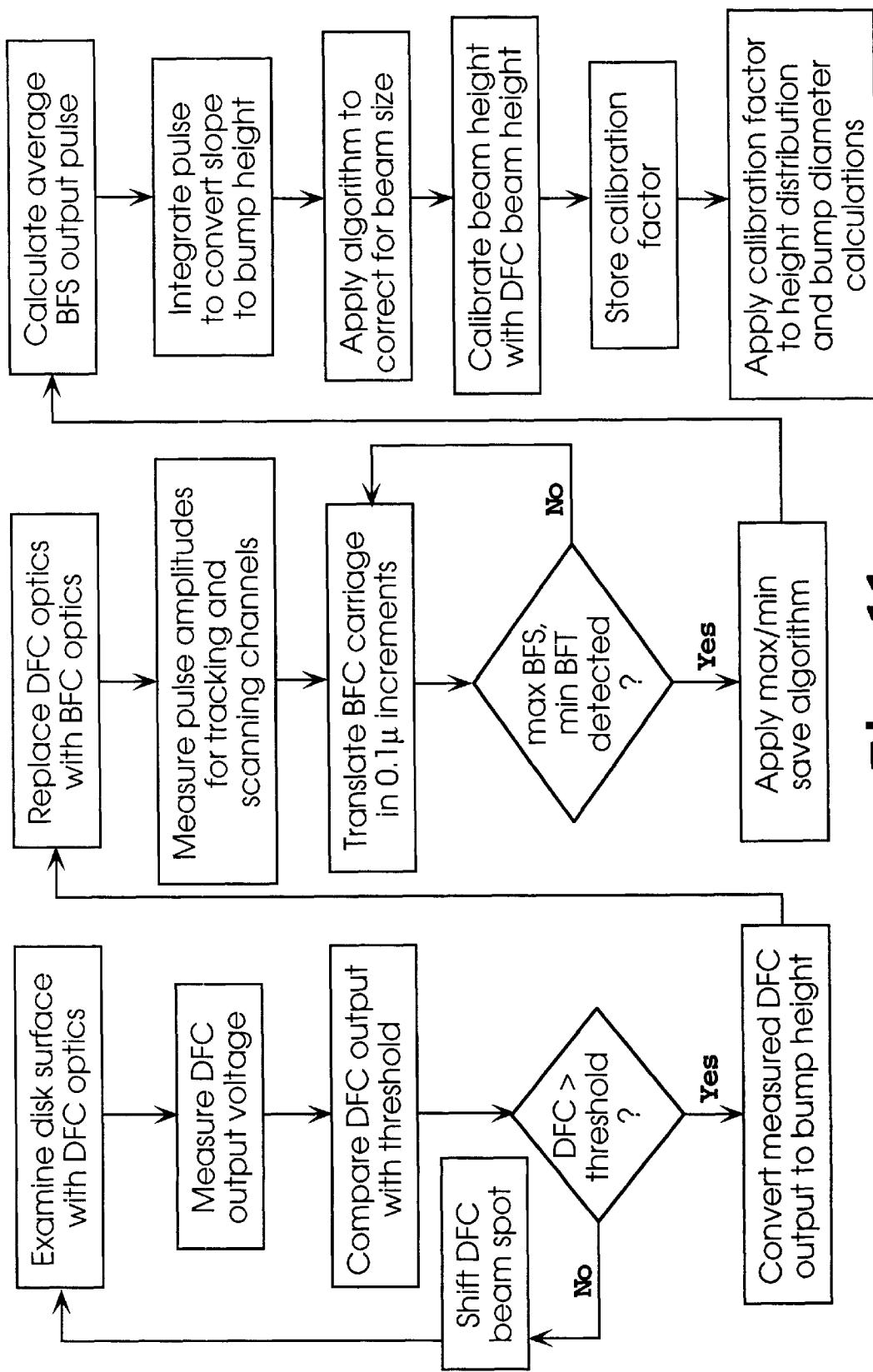
FIG. 11 is a flow chart of the overall operation of the apparatus.

FIG. 11 is a flow diagram of the basic operating steps of the apparatus. Thus, the flow diagram provides both the basic instructions used by the control unit in operation of the apparatus, and a guide to the method of the invention, as carried out by the apparatus. It will be appreciated that some features shown in the diagram, for example, the operation of the darkfield channel, may not be essential to the operation of the apparatus, while other features, particularly those related to signal-processing operations, having been described above, are here omitted.

In normal operation of the apparatus, as outlined in the figure, the brightfield and darkfield channels are used sequentially. Initially, the darkfield channel is positioned to "inspect" a textured region of the substrate, where the substrate may be either spinning or stationary. The channel output voltage, which is related to the level of light diffracted from the illuminated region, is then compared with a DFC threshold voltage, to insure that the disk is textured. If it is, the control unit program converts the measured voltage to average bump height, using a look-up table generated, for example, by calibration with atomic force microscopy measurements of a textured substrate. If it is not, the control unit flashes a red warning icon on its display and stops the operation of the apparatus.

The control unit then replaces the darkfield channel illumination optics with the brightfield channel illumination optics, by sliding the darkfield telescope lens assembly out of the LDCA beam path, and moving the brightfield objective lens into operational position. The initial darkfield measurement insures that the disk is textured and provides a means by which the bump height measurements made by the brightfield channel may be checked for accuracy.

With the disk spinning, the BFS and BFT output are recorded over a series of carriage incremental shifts in a radial direction. The carriage is translated in 0.1 micron increments until above-threshold BFS and below-threshold BFT signal amplitudes are simultaneously detected in a single revolution. The "max/min save" algorithm is now applied to save to save only brightfield tracking signals corresponding to the above-threshold BFS/below-threshold BFT signal amplitude conditions. The saved signals are then used to calculate the average BFS signal. This signal is in turn integrated, as in FIG. 6, to convert bump slope to height. This raw bump height distribution may then be corrected for finite focused illumination spot size, as given above. Bump crater wall height and separation are then calculated by using a simple "max find" algorithm. The separation between the locations of the found height maxima corresponds to the bump diameter.

To calibrate the brightfield scanning channel, the bump height distribution calculated from the brightfield channel is compared with that measured with an AFM, and, if necessary, is corrected by a calibration factor. This calibration factor is then employed in subsequent brightfield height distribution calculations.

From the foregoing, it can be appreciated how various objects and features of the invention are met. The "max/min save" algorithm feature of the invention permits simplified hardware for the measurement of LZT bump-height and diameter, without the need for complex focus and tracking servos.

The use of position sensor detectors in a differential mode, in one embodiment of the invention, gives improved signal-to-noise ratio, and allows for signal output correction for changes in the pointing angle of the LDCA's output beam.

The use of both darkfield and brightfield channels, in another embodiment of the invention, allows the apparatus to quickly verify the presence of LZT bumps and provides a means by which the bump height measurements made by the bright field channel may be checked for accuracy.

Additional features, such as the improved objective lens, and the deconvolution algorithm for correcting for the illumination spots finite diameter, give further improvement in the accuracy of the LZT bump height and diameter measurements.

Although the invention has been described with respect to particular embodiments, it will be appreciated that various changes may be made without departing from the invention. For example, depending upon how the LBS system is implemented, it may be used for simply monitoring the LZT process or for real time closed loop LZT tool control. Finally, the LBS system may be implemented with either one or two optical heads, depending upon whether or not the host LZT tool textures both sides of the disk simultaneously.

It is claimed:

1. A method of measuring the height distribution of laser-zone texture bumps on a rigid magnetic disk substrate, comprising illuminating the substrate, with the substrate rotating about its center axis, with a focused laser beam, measuring the deflection of the laser beam due to specular reflection of the beam by laser-zone texture bumps on the substrate, as a function of time, in both scanning and tracking directions, calculating scanning and tracking deflection values which characterize beam deflections in the scanning and tracking directions, respectively, for a texture bump passing through an illumination spot produced by the beam on the substrate, selecting for bump-height analysis, those texture bumps whose scanning deflection values are above a selected threshold value and whose tracking deflection values are below a selected threshold value, indicative of a condition in which the selected textured bumps are each in focus and centered within said illumination spot, and determining, from the measured deflection of the beam in the scanning direction, the heights and diameters of the selected bumps.

2. The method of claim 1, which further includes, with each revolution of the substrate, changing the tracking position of the laser beam spot on the disk by a distance substantially less than the diameter of the laser spot, and measuring the deflection of the beam for a plurality of bumps at each new moved position.

3. The method of claim 2, wherein the laser spot has a $1/e^2$ diameter of between about 1.5–5.0 $\mu$m, and said motion is carried out in increments of less than about 0.3 $\mu$m.

4. The method of claim 1, wherein the deflection of the beam is measured by detecting the scanning- and tracking-direction deflections of the deflected beam with a position sensor detector that produces time-dependent output voltage amplitudes that are proportional to the extent of deflections.

5. The method of claim 4, wherein the position sensor includes first and second position sensing detectors, with the second detector being rotated 180 degrees about the optical axis relative to the first detector, such that positive lateral spot motion produces an output signal with positive pulse amplitude from the first detector, and an output signal with negative pulse amplitude from the second detector; and further wherein differential amplifiers are used for differencing the output signals from the two detectors, thus to independently and differentially combine the scanning and tracking output signals and provide enhanced signal-to-noise ratio.

6. The method of claim 4, wherein said determining includes using the scanning direction time dependent output signal voltage amplitude to determine the texture bump height.

7. The method of claim 4, further comprising the step of measuring the diameter distribution of laser-zone texture bumps on a rigid magnetic disk substrate, by, for each selected bump, detecting the bump height distribution maxima of the bump and determining the corresponding scanning axis positions of these maxima.

8. Apparatus for measuring the height distribution of laser-zone texture bumps on a rigid magnetic disk substrate, comprising a disk holder for supporting the substrate and rotating the same about its axis, an optical beam-source assembly for directing a focused laser beam on the substrate, with the substrate supported and rotated by the disk holder, said assembly including a shiftable carriage for shifting the tracking position on the substrate of an illumination spot produced by the beam on the substrate, an optical detection assembly for measuring the deflection of the laser beam due to specular reflection of the beam by laser-zone texture bumps, as a function of time, in both scanning and tracking directions, computational means operatively connected to said detection assembly for (i) calculating scanning and tracking deflection values which characterize beam deflections in the scanning and tracking directions, respectively, for a texture bump passing through the illumination spot produced by the beam on the substrate, (ii) selecting for bump-height analysis, those texture bumps whose scanning deflection values are above a selected threshold value and whose tracking deflection values are below a selected threshold value, indicative of a condition in which the selected textured bumps are each in focus and centered within said illumination spot, and (iii) determining the texture bump heights of the selected bumps from the beam deflections in the scanning direction.

9. The apparatus of claim 8, wherein said computational means is operatively connected to said carriage, for shifting the same in increments effective to shift the illumination spot in the tracking direction, where the laser spot has a $1/e^2$ diameter of between about 1.5–5.0 $\mu$m, and the computational means is operative to shift the carriage in increments effective to shift the illumination spot less than about 0.3 $\mu$m.

10. The apparatus of claim 8, wherein the optical detection assembly includes a position sensor for (i) detecting the scanning and tracking deflections, respectively, caused by specular reflection of such beam, and (ii) generating time-dependent voltage signals whose amplitudes are proportional to the extent of such deflections.

11. The apparatus of claim 10, wherein the position sensor includes first and second position sensing detectors, with the second detector being rotated 180 degrees about the optical axis relative to the first detector, such that positive lateral spot motion produces an output signal with positive pulse amplitude from the first detector, and an output signal with negative pulse amplitude from the second detector; and further wherein differential amplifiers are used for differencing the output signals from the two detectors, thus to independently and differentially combine the scanning and tracking output signals and provide enhanced signal-to-noise ratio.

12. The apparatus of claim 11, wherein the computational means for determining texture bump height includes an integrator for integrating the time-dependent scanning axis output signal over time.

13. The apparatus of claim 8, wherein the computational means for determining texture bump height includes an integrator for integrating the time-dependent output signal of the scanning position sensor over time.

14. The apparatus of claim 13, wherein the computational means is effective to measure bump diameter determining, for each selected bump, the bump height distribution maxima of the bump and determining the corresponding scanning axis positions of these maxima.

15. The apparatus of claim 13, wherein the computational means for determining texture bump height includes means for (i) multiplying the Fourier transform of the scanning axis output signal with the reciprocal of the Fourier transform of a correction function which describes the intensity distribution of the focused illumination spot, and (ii) performing a reverse Fourier transform on the multiplied signal, to generate a corrected scanning axis output signal.

16. The apparatus of claim 8, wherein said optical beam-source assembly further includes additional position sensing detectors, used in a differential mode, which are operatively connected to the computational means for detecting changes in the pointing angle of the axis of said focused laser beam, and said computational means includes means for correcting the scanning and tracking axes beam deflections produced by the LZT bumps, as measured by the brightfield collection optics.

17. The apparatus of claim 16, wherein the additional position sensing detectors include two position sensitive detectors, used in a differential mode, for the simultaneous measurement of output beam drift in both the scanning and tracking axes.

18. The apparatus of claim 8, wherein the beam source assembly includes an objective lens composed of two achromat lenses, each having a plane parallel glass plate located near the short conjugate side of the lens, said lens being characterized by diffraction limited on-axis performance, and off-axis performance that is not diffraction limited.

19. The apparatus of claim 8, which further includes a darkfield optics assembly comprising (i) a darkfield illumination beam assembly for directing onto the substrate, an illumination spot having a diameter between about 0.5–1.0 mm, and (ii) a darkfield detection assembly operatively connected to the computational means for detecting light scattered from the substrate surface, wherein the computational means includes means for computing average bump height in the illuminated field from the scattered light detected by the darkfield detection assembly.

20. The apparatus of claim 19, wherein the detection assembly is positioned with respect to the illuminated substrate, to detect one or more of the bright regions of the scattered light.

* * * * *